US005187774A

United States Patent [19]

Ericson

[11] Patent Number: 5,187,774

[45] Date of Patent: Feb. 16, 1993

[54] REFERENCE AREA USABLE WITH A FORM FOR CORRECTION OF FORM MISALIGNMENT IN A PRINTER

[75] Inventor: Richard E. Ericson, Cannon Falls, Minn.

[73] Assignee: Minnesota Mining and Manufacturing Company, St. Paul, Minn.

[21] Appl. No.: 469,222

[22] Filed: Jan. 24, 1990

[51] Int. Cl.[5] .............................. G06K 15/00

[52] U.S. Cl. .............................. 395/111; 400/630; 400/632

[58] Field of Search .............................. 364/521, 518, 522; 340/747, 750, 706, 703, 728; 382/46, 56; 355/203, 77, 317; 400/613.1, 630, 631, 632; 395/102, 111

[56] References Cited

U.S. PATENT DOCUMENTS

| | | | |
|---|---|---|---|
| 3,587,812 | 6/1971 | Budenstein et al. | 197/133 |
| 4,026,405 | 5/1977 | de Poncins | 197/133 R |
| 4,066,015 | 1/1978 | Polko | 101/228 |
| 4,070,223 | 1/1978 | Stalzer | 156/264 |
| 4,251,162 | 2/1981 | Krammerer et al. | 400/613.1 |
| 4,266,880 | 5/1981 | Buchanan | 400/550 |
| 4,316,199 | 2/1982 | Greenig et al. | 346/160 |
| 4,403,301 | 9/1983 | Fessel | 364/900 |
| 4,428,287 | 1/1984 | Greiner | 101/170 |
| 4,508,462 | 4/1985 | Haruhara | 400/70 |
| 4,529,227 | 7/1985 | Fields | 282/5 |
| 4,541,337 | 9/1985 | Schaul | 101/227 |
| 4,552,065 | 11/1985 | Billington et al. | 101/93.33 |
| 4,658,366 | 4/1987 | Posh | 364/523 |
| 4,705,297 | 11/1987 | Wakeman | 281/2 |
| 4,725,156 | 2/1988 | Proulx et al. | 400/630 |
| 4,831,420 | 5/1989 | Walsh et al. | 355/203 |

OTHER PUBLICATIONS

Atech Software, "Avery LabelPro", pp. 1.2-1.4, 1989.

*Primary Examiner*—Gary V. Harkcom
*Assistant Examiner*—Phu K. Nguyen
*Attorney, Agent, or Firm*—Gary L. Griswold; Walter N. Kirn; Eric D. Levinson

[57] ABSTRACT

A reference area usable with a rectangular form when the form is used with a computer controlled printer. The reference area having a pattern and a reference point. The pattern allowing the location of a mark printed by the printer on the pattern to be readily identified on an equivalent reference area displayed on a display monitor for the computer. The reference point is positioned so it will receive a reference mark when printed on the reference area by the printer provided the form is not misaligned in the printer. A reference mark received at the reference area provides information relative to the reference point that is a measure of the amount of vertical and horizontal misalignment of the form in the printer. This information, when placed in the computer, makes it possible for the computer to correct for any misalignment before any printing is done on the form.

20 Claims, 5 Drawing Sheets

REFERENCE AREA USABLE WITH A FORM FOR CORRECTION OF FORM MISALIGNMENT IN A PRINTER

BACKGROUND OF THE INVENTION

1. Field of the Invention

The invention presented herein relates to forms to be completed by a printer which receives data and control signals from a computer; and in particular to a reference area usable with such forms and to the method for use with such a printer, including an operator's input to the computer to electronically adjust the printing control provided by the computer to correct for any vertical or horizontal misalignment of the form in the printer.

1. Prior Art

U.S. Pat. No. 4,725,157 to T. A. Proulx et al discloses an arrangement that uses a web of forms which have preprinted marks with associated numbers along the vertical edge of each form. The forms are used in a printer that is controlled by a computer. After the form is inserted into the printer, the operator use a computer program which prints a mark on the form, the location of which can be related to the preprinted marks. If the printed mark is not on the desired line of the form, the operator is instructed to enter into the computer the line number or other indicia positioned opposite the printed mark. The computer uses such input to move the form vertically relative to the printer head to properly align the form vertically.

The embodiment shown in the patent to T. A. Proulx shows a web of forms that has holes along the outer edges of the web for use with a tractor-feed mechanism which reduces the form adjustment problem in the horizontal direction. If the method in the T. A. Proulx patent is used for single sheet printing, a horizontal alignment problem is presented. Horizontal alignment would have to be accomplished by a physical movement of the sheet by the operator. Further, the initial insertion would have to be done with a level of accuracy that would assure that the mark put on the form for the vertical alignment process would fall along the edge of the sheet or on the sheet close to the edge where the preprinted marks are provided.

The patent to Proulx et al also discusses a number of other patents which are directed to the problem of registration of a form in printers with the deficiencies noted relative to the solutions provided by such patents.

SUMMARY OF THE INVENTION

The invention presented herein provides a solution to the deficiencies present in the known efforts made for the proper alignment of a rectangular form relative to the printing input to be made on the form by a computer controlled printer. The invention includes a reference area usable with a rectangular form when the form is used with such a printer. The reference area, which is capable of receiving a mark from the printer, includes a reference point and presents a pattern whereby a mark placed in the reference area can have its location defined by the pattern relative to the reference point. A pattern for the reference area having such structure may, for example, include a grid having a first set of a plurality of parallel lines which are parallel to the top edge of the form with which the grid is used and a second set of a plurality of parallel lines which are perpendicular to and intersect with the first set of lines.

The reference point for the reference area is a point that will receive the reference mark when printed, provided the form with which the reference area is used is not misaligned in the printer. In the case of the grid pattern, the intersection of one line of the first set with one line of the second set can provide the reference point. If the form, along with the reference area, is placed in the printer, and the printer is directed to print a reference mark with such mark being made within the reference area, the reference mark and the reference point of the reference area provides information that is usable for adjusting the operation of the printer so printing can be accurately placed on the form relative to the reference point on the form. How such information is entered into the computer is determined by the computer software used for the control of the printer.

The method of the invention includes the steps of providing a display monitor for the computer controlling the printer; providing on the display monitor a displayed reference area equivalent to the reference area on which the reference mark is printed; providing on the display monitor a cursor having a position known by the computer relative to the reference point of the displayed reference area; using a computer input device to move the cursor at the display monitor to the position on the displayed reference area corresponding to the position of the reference mark printed on the reference area, thereby supplying the computer with information defining the position of the printed reference mark relative to the reference point of the reference area, which is a measure of the degree of vertical or horizontal misalignment of the form in the printer and providing instructions via a computer program for using such information to adjust the printing operation, so printing to be placed on the form will be properly aligned on the form.

The reference area described can be printed on the form, on a removable portion that is an extension of the form, or placed on a holder for forms. The holder with the form can be inserted into the printer to present the form to the printhead of the printer. Rather than be printed on a form or holder, the reference area can be printed on a separate piece of paper and attached temporarily to a form of holder for forms, such as by a non-aggressive adhesive or removable tape.

BRIEF DESCRIPTION OF THE DRAWINGS

The invention presented herein will be better understood from the following description considered in connection with the accompanying drawings wherein.

DETAILED DESCRIPTION

Figure 1:
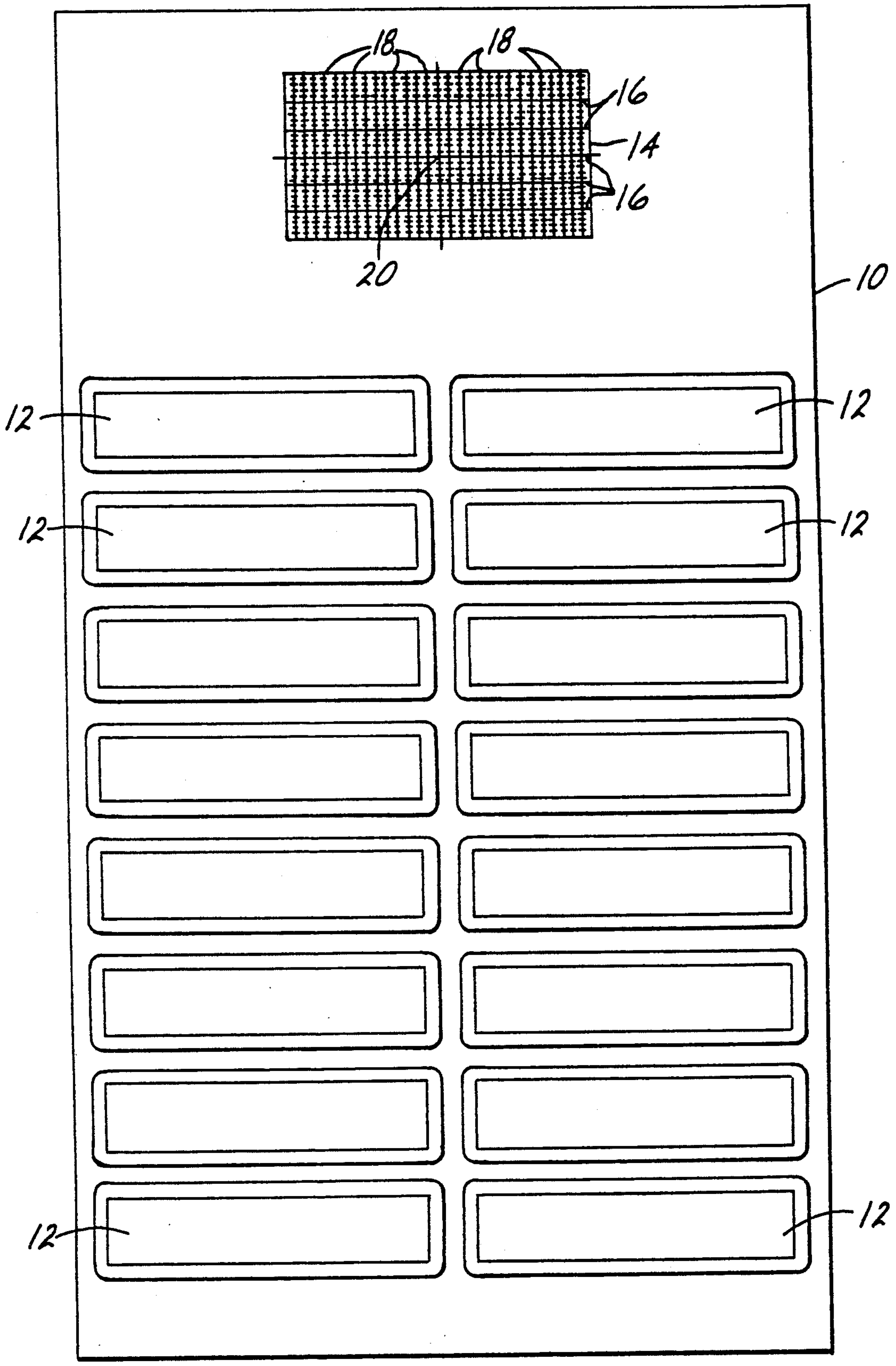
FIG. 1 is a plan view of a form bearing sheet with a reference area presented thereon according to the principles of this invention.

Referring to FIG. 1 of the drawing, a preferred embodiment of the invention is shown. A form that is a sheet of paper 10, which has blank areas 12 for receiving printing, has a reference area 14 printed on it near its top that includes a reference point 20. Sheet 10, by way of example, is shown in FIG. 1 as a sheet of label stock carrying a plurality of labels which provide the blank areas 12 to ba printed. The reference area 14 presents a pattern whereby the location of a mark placed within the pattern relative to the reference point can be readily found on a reference area corresponding to the reference area 14. The printed reference area 14 shown in FIG. 1 has such a pattern that is in the form of a grid provided by a first set of a plurality of parallel lines 16 that are equally spaced and are parallel to the top edge of the sheet 10, as viewed in FIG. 1, plus a second set 18 of a plurality of parallel lines that are equally spaced, which intersect and are perpendicular to the first set of lines. In the FIG. 1, the intersection of the center most line of each set provides the reference point 20.

The paper form 10 with the reference area 14 is usable with a printer (not shown) that is controlled by a computer (not shown). The form 10, when placed in a printer, will generally be vertically or horizontally misaligned to some degree thereby causing the printing that is to be placed in the blank area 12 to be misaligned in the blank areas 12 unless steps are taken before the printing operation to correct for the misalignment. The reference area 14 is useful for providing information to the computer so correction can be made for any vertical and horizontal misalignment of the form 10 in the printer.

Since the reference area 14 is used before the printer is operated to print the desired printing on the form 10, placement of the reference area 14 above the area of the form 10 that is to receive the printing is preferred, since there are some computer-controlled printers that cannot be operated to move the roller feed in the reverse direction. Further, the form 10 with which the reference area is used may be label stock and may jam if the roller feed is reversed.

As will be explained, use of the reference area requires the printing of a reference mark on the reference area that is used for alignment of the form 10 prior to initiating operation of the printer for printing on the form 10. The position of the reference mark relative to the reference point 20 on the reference area must be readily seen. This may require movement of the sheet 10 vertically away from the print head of the printer after the reference mark has been printed so the entire reference area 14 can ba readily viewed. Accordingly, it is preferred that the reference area 14 be positioned above the area of the form 10 to receive printing by a distance equal to or greater than the vertical distance the form 10 must be moved to provide a full view of the reference area 14. This vertical movement may not be necessary on some printers, in which case a movement of the print head to the left margin may suffice.

It is desirable that the vertical dimension of the reference area 14 be as small as possible so the usable printing region on the form 10 is not significantly shortened. It should, however, be large enough so the operator can easily insert the form in the printer so the reference mark that is printed will fall within the reference area 14. The position of the reference area 14 relative to the vertical center line of the form 10 is not critical, but centering it on the vertical center line may be desirable since it may provide a visual aid to the operator when the form 10 is inserted in the printer. If the reference area 14 is positioned too far to the left or right of the vertical center line, limitations may be imposed on the width of the reference area 14. If it is desired that all possible cases of form insertion be considered, the right side of the reference area 14 should be at a position where the reference mark would fall if the form were inserted at the extreme left of the printer bed. Likewise, the left side of the reference area 14 should be at a position on the form 10 where the alignment mark would fall if the form 10 were inserted at the extreme right of the printer bed. Accordingly, to meet the above criteria, the width of the reference area 14 should be equal to the difference between the insertion or bed width of the printer and the width of the form 10. This means the narrower the form 10, the wider the reference area 14. In practice, if the operator is directed to position the form 10 so its vertical center is at the center of the print bed of the printer, the reference area 14 need only be as wide as required for the operator to be certain that the reference mark will fall within the reference area 14.

One other aspect regarding the position of the reference area 14 relative to the form 10 is the need that the reference point 20 of the reference area 14 be positioned at a predetermined point relative to a point on the form that would receive a printed mark if the form were properly aligned in the printer. If the form is properly aligned in the printer and the reference area 14 is positioned so its reference point 20 is at the proper predetermined point relative to the aforementioned point on the form 10, a reference mark printed on the reference area 14 by the printer could be received at the reference point 20. With the reference area 14 positioned above the area of the form 10, as described above, a reference mark directed to the reference area 14 after the form 10 is placed in the printer will provide a measure of the degree to which the form is vertically and horizontally misaligned.

Figure 2:
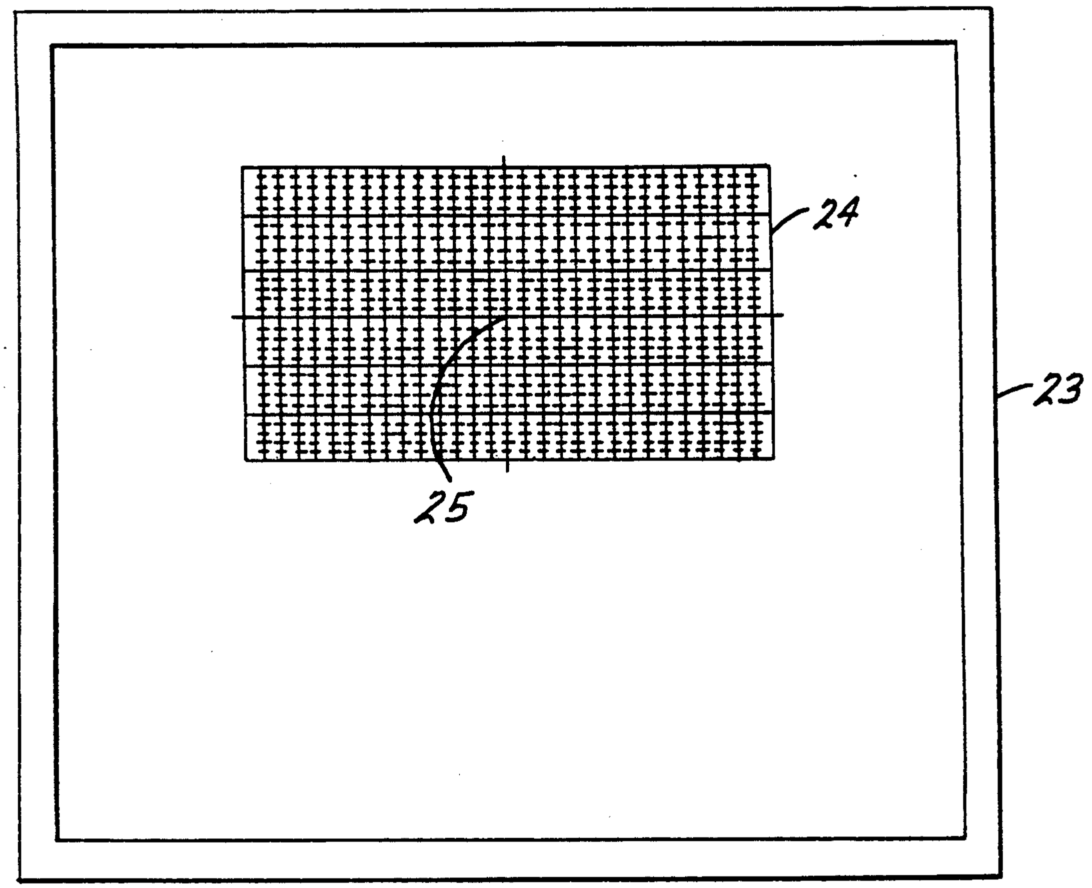
FIG. 2 is a pan view of a portion of a display monitor for a computer showing a reference area displayed on the monitor screen that is utilized in the method of this invention.

The computer that controls the printer is programmed to provide a display reference area 24, corresponding to the reference area 14 of form 10, at the computer display monitor 23, such as shown in FIG. 2. The display can be viewed after the printer has been directed to provide a reference mark on the reference area 14 of the form 10. The computer is then programmed to instruct the printer to move the form 10 along with the reference area 14 a predetermined vertical distance or to move the print head to the margin so the reference area 14 and the reference mark can be readily viewed by the operator. The computer is also programmed to provide a cursor 25 at a position that is known to the computer relative to the reference point for the display reference area 24. In FIG. 2, such a position for the cursor 25 corresponds to the position of the reference point.

Using a computer input device, such as a mouse, track ball, graphics tablet, keyboard arrow keys, etc., the operator moves the cursor 25 to a position that corresponds to the position of the reference mark that was printed on the reference area 14 of the form. The computer program causes the computer to keep track of the horizontal and vertical movement required to move the cursor from its initial position to the position on the display reference area 24 that corresponds to the position of the reference mark of the reference area 14 of the form 10. Using this information, the computer determines the direction and amount that the printing must be shifted along the horizontal. Knowing how far the printer platen or roller was moved, if at all, to put the reference area 14 in view for the operator after the reference mark was printed, the computer also determines how much additional movement of the printer platen is needed for the vertical movement of the form 10 that must be provided. Making these corrections, the form 10 is then properly aligned and a printing operation can be initiated.

The printing that is carried out for a particular form is determined by keyed inputs to the computer that are provided by the operator in accordance with a computer program for the form. Such aspect is not a part of the present invention and, therefore, need not be described any further.

The method just described for using reference area 14 with a form 10 that is to be printed by a computer controlled printer will now be described with reference to the flow diagram set forth in FIG. 3. The operations indicated in the flow diagram are carried out under the control of the computer. They are carried out after the printing to be done on a form has been entered into the computer and the operator has inserted the form 10 in the printer with the associated reference area 14 positioned where a reference mark when made will be received within the reference area 14.

Figure 3:
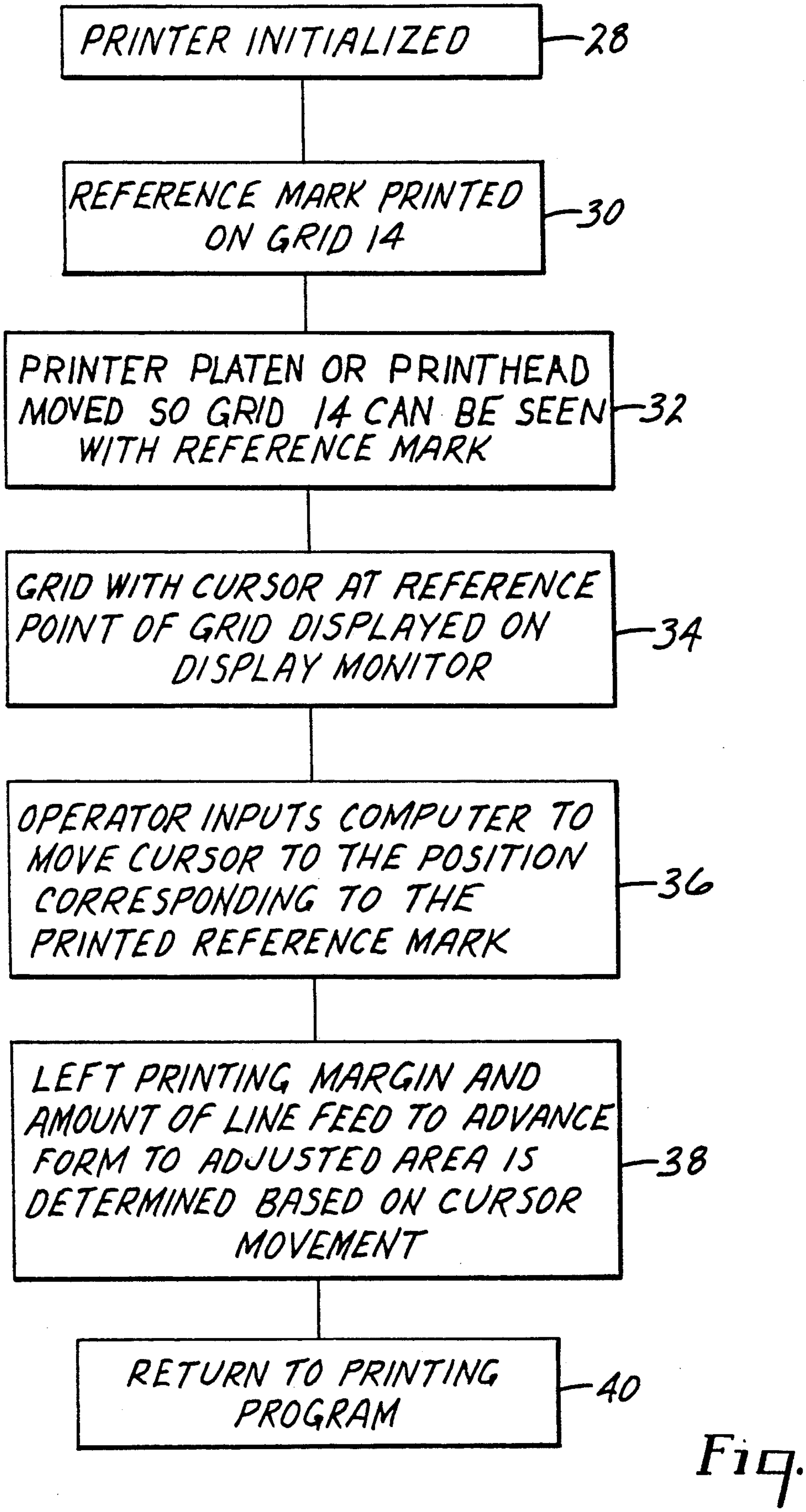
FIG. 3 is a flow diagram of the method using a sheet of the type shown in FIG. 1 with a computer controlled printer for correcting any vertical or horizontal misalignment of the sheet in the computer printer.

The printer is initialized as indicated at 28 in FIG. 3. Following the initializing of the printer, the program directs the printer to print an alignment or reference mark on reference area 14 as indicated at 30 and to then, as indicated at 32, operate the printer platen or roller to move the form 10 a predetermined vertical distance and/or to move the print head away from the reference area 14 so the reference mark can be seen. The program, as indicated at 34, causes a display reference area 24 corresponding to the reference area 14, to be displayed on the display monitor of the computer along with the cursor 25. The position of the cursor 25 relative to the reference point of the display reference area 24 is known by the computer. The operator is then required, as indicated at 36, to provide inputs to the computer to move the cursor to the position on the displayed reference area that corresponds to the position of the reference mark that was printed on the reference area 14 per step 30. Using the horizontal and vertical movement information provided by the movement of the cursor, the program, as indicated at 38, causes the left printing margin to be adjusted and provides the amount of platen motion required to advance the form to correct for the misalignment of the form in the printer. A return to the printing program is then made, as indicated at 40, so that the printing to be carried out will be under control of the printing program.

Figure 4:
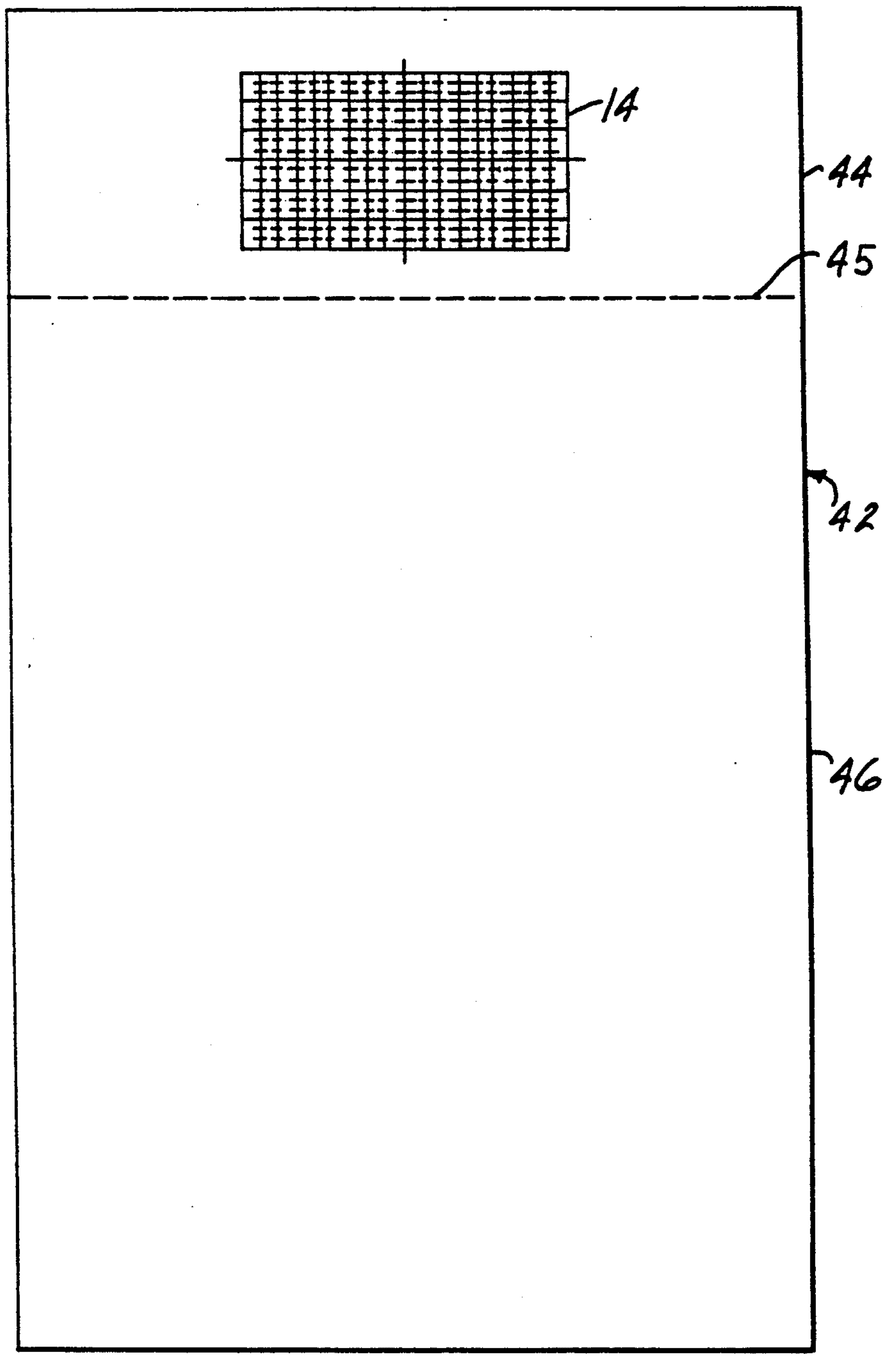
FIG. 4 is a plan view of a sheet usable in a computer controlled printer, the sheet having a reference area that can be detached from the sheet.

There will be instances where a preprinted form or label stock requires the printing to begin very close to the top of the sheet. This precludes the printing of a reference area 14 on the sheet for the form as described in connection with FIG. 1. FIG. 4 shows a solution to this situation wherein the label stock or the preprinted form is provided by a sheet of paper 42 which is longer in length than the portion of the form to be printed. The lengthened portion 44 is separated from the portion 46 of sheet 42 on which the form will be preprinted by perforations 45 to enable removal of the lengthened portion 44 from the portion 46. A reference area 14 is printed on the portion 4 and positioned relative to the printed formats as described earlier.

Figure 5:
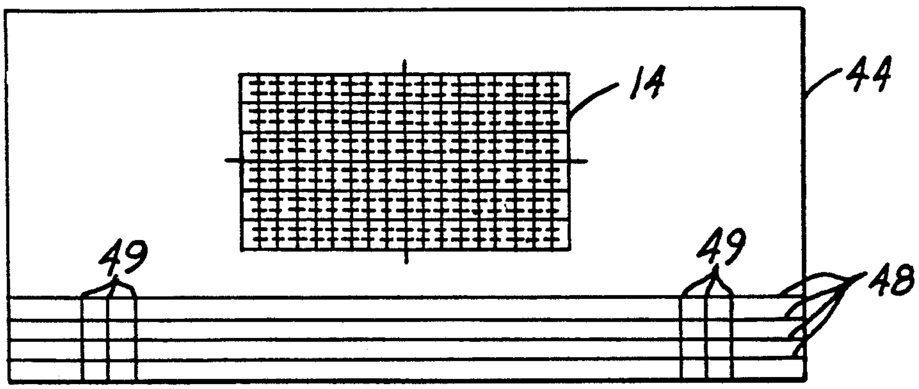
FIG. 5 is a plan view of a sheet having a reference area that can be attached to a sheet to be printed by a computer controlled printer.

The portion 41, of course, can be an entirely separate sheet 44 on which the reference area 14 is printed as shown in FIG. 5. It can be temporarily positioned and secured with respect to the sheet to be printed by the computer printer. Removable tape or any other non-permanent fastening means, such as a non-aggressive adhesive, can be used to accomplish such temporary positioning of the reference area. Vertical positioning lines 48 and horizontal positioning lines 49 can be provided on portion 44 so the reference area will be properly positioned relative to the sheet that is to be printed by the computer printer.

Figure 6:
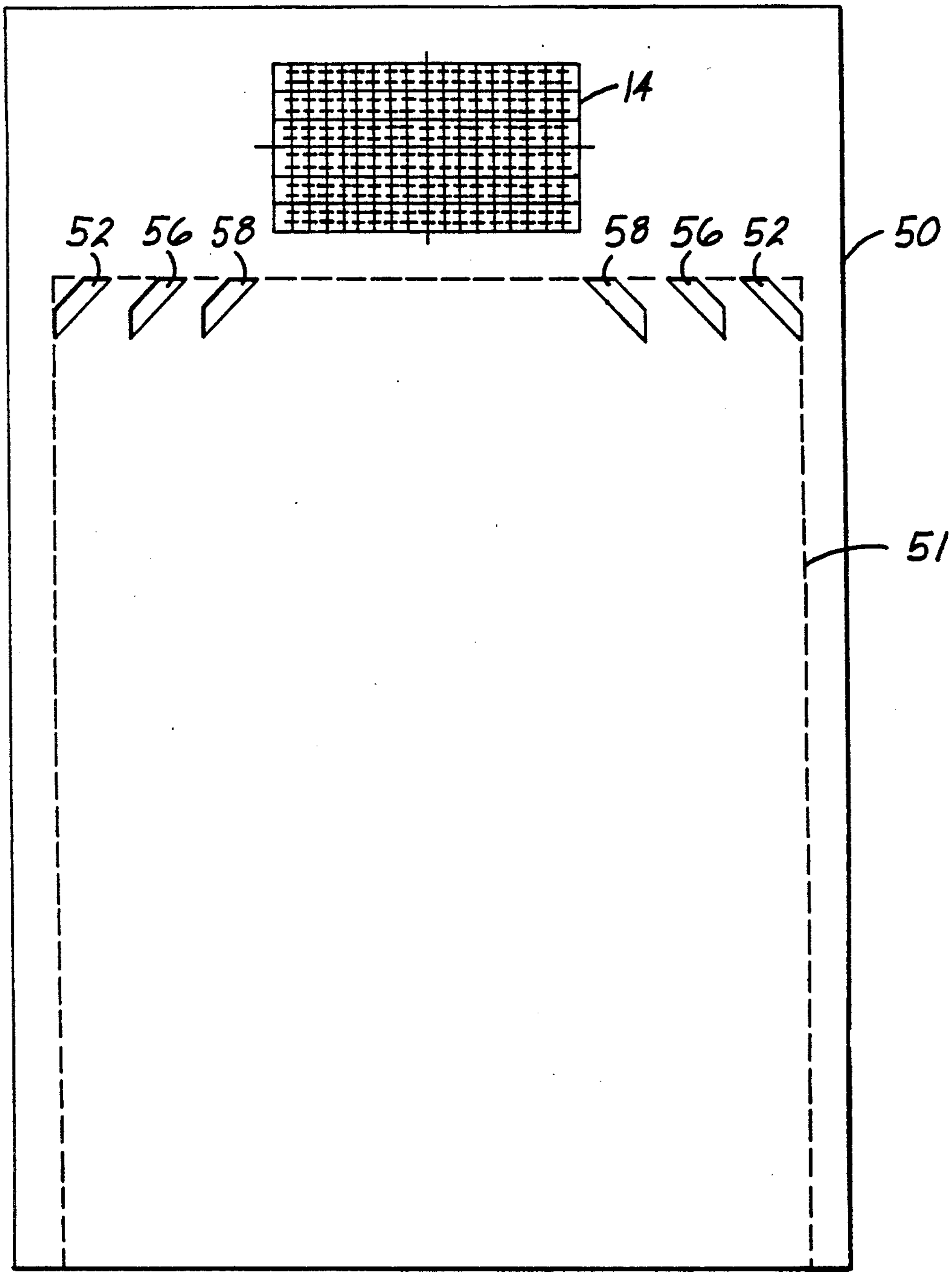
FIG. 6 is a flexible holder for a sheet of paper with a reference area presented on the holder according to the principles of this invention.

A flexible carrier sheet 50, on which a reference area 14 is positioned that can receive a reference mark from a computer printer, can be provided for the sheet that is to receive the printing. Such a carrier is shown in FIG. 6. The uppermost corners of a sheet, indicated by the dotted line 51, to be used with the carrier sheet 50 are positioned on the sheet 50 by the insertion of such corners into openings 52 and 54 provided in sheet 50. Additional pairs 56 and 58 of such openings can be provided in the sheet 50 to receive various width sheets to be presented to a computer printer. Markings corresponding to the aforementioned openings can be used instead of position openings to position the sheet to be printed on the carrier sheet 50 with means, such as a non-aggressive adhesive or removable tape, used to secure such sheet to the carrier sheet 50.

The foregoing description has been given for impact or ink-jet printers. The use of a reference area for printer alignment is applicable also to laser printers and impact printers having paper feed trays designed to feed the sheets to be printed in a consistent fashion with respect to the printing mechanism. For such applications a sheet bearing a reference area that will receive a reference mark has to ba sent through such printer only once, so long as the software program for the printer stores the alignment information that is produced based on the input information that the operator supplies to the computer for such printer after the reference mark has been placed on the reference area of the sheet supplied to the printer.

It will be appreciated by those of ordinary skill in the art that the pattern present at the reference area to be used with a form is in no way limited to the grid pattern illustrated in FIG. 1 of the drawing. Shaded areas within the reference area can be provided and colors for various portions of the pattern can be utilized. The only restriction on what form the pattern can take is that it be a pattern for which an equivalent pattern can be produced at a computer display monitor so a display reference area corresponding to the reference area used with a form can be made available at a computer display monitor that is used with the computer that controls the printer with which the forms and reference area are used.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

I claim:

1. A method for correcting for the vertical and horizontal misalignment of a rectangular form placed in a printer that is controlled by a computer having a display monitor including the steps of:

a. providing a reference area with the rectangular form that is received in the printer ahead of the portion of the rectangular form that is to receive printing from the printer, said reference area having a pattern with a reference point at which a reference mark will be received when printed provided the form is not misaligned in the printer;

b. presenting said pattern to the printhead of the printer and printing a reference mark on said pattern;

c. moving said reference area and said rectangular form with respect to the printer head so said pattern with the reference mark can be seen by the operator;

d. providing a displayed reference area on the display monitor that corresponds to said reference area, with a cursor at an initial position;

e. providing inputs to the computer to move the cursor to the position on the displayed reference area corresponding to the position of the printed reference mark provided at step b; and f. operating the computer on the basis of the inputs provided at step e to change the left hand printing margin to correct for horizontal misalignment and determine the amount of vertical movement required to be imparted to the rectangular form to correct for any vertical misalignment.

2. The method recited in claim 1 wherein said pattern includes a first set of a plurality of parallel lines and a second set of a plurality of parallel lines which intersect said first set, the intersection of one line of said first set and one line of said second set providing said reference point.

3. The method recited in claim 2 wherein said first set of a plurality of parallel lines are parallel to the top edge o the form and said second set of a plurality of lines are perpendicular to said first set.

4. The method recited in claim 1 wherein said reference point is centrally located in said pattern.

5. The method recited in claim 1 wherein said reference area is positioned relative to the rectangular form to enable said reference area to be presented to the print head of said printer ahead of the portion of the rectangular form that is to be printed.

6. The method recited in claim 5 wherein said reference area is ahead of said portion by a distance that enables the reference area to be viewed above the print head of a printer before said portion is presented to the print head.

7. A computer system with automated printing alignment, including:

a printer configured to receive a form having a first reference pattern with a first reference point;

a monitor;

an operator actuated cursor controller; and a computer coupled to the printer, monitor, and curser controller, including;

first means for causing the printer to print a mark on the first reference pattern of the form in the printer, any displacement of the printed mark from the first reference point being caused by misalignment between the for and printer;

second means for causing a second reference pattern with a second reference point corresponding to the first reference pattern and point to be displayed on the monitor;

third means responsive to the cursor controller for moving a cursor on the monitor to a location on the second reference pattern corresponding to the location of the printed mark on the first reference pattern on the form in the printer;

fourth means for providing misalignment information representative of the location of the cursor with respect to the second reference point on the second reference pattern and corresponding to the misalignment between the form and printer; and fifth means responsive to the misalignment information for causing the printer to print in alignment on the form.

8. A computer system according to claim 7 wherein said first reference pattern includes a first set of a plurality of parallel lines plus a second set of plurality of parallel lines which intersect said first set, the intersection of one line of said first set and one line of said second set providing said first reference point.

9. A computer system according to claim 8 wherein said first set of a plurality of parallel lines are parallel to the top edge of the form and said second set of a plurality of lines are perpendicular to said first set.

10. A computer system according to claim 7 wherein said first reference point is centrally located in said first reference pattern.

11. A computer system according to claim 7 wherein said first reference pattern is positioned relative to the rectangular form to enable said first reference pattern to be presented to the print head of printer ahead of the portion of the rectangular form that is to be printed.

12. A computer system according to claim 11 wherein said first reference pattern is ahead of said portion by a distance that enables said first reference pattern to be viewed above the print head of a printer before said portion is presented to the print head.

13. A computer system according to claim 7 wherein said first reference pattern is combined with said form and said first reference point is centrally located between the longer sides of said form.

14. A computer system according to claim 13 wherein said first reference point is centrally located in said first reference pattern.

15. A computer system according to claim 7 wherein said first reference pattern is located on a carrier sheet for said form; said form having means for positioning said form on said carrier sheet.

16. A computer system according to claim 15 wherein said carrier sheet has openings in which at least two corners of said form can be received, said openings providing said means.

17. A computer system according to claim 15 wherein said first reference pattern is on said carrier sheet and is positioned relative to the positioning provided by said carrier sheet for said form to enable said first reference pattern to be presented to the print head of a printer ahead of the portion of said firm that is to be printed.

18. A computer system according to claim 17 wherein said first reference pattern is ahead of the position provided by said carrier sheet for said form by a distance that enables said first reference pattern to be viewed above the print head of a printer before said portion is presented to the print head.

19. A computer system according to claim 7 wherein said first reference pattern is combined with said form, said form having a first portion for receiving printing for completion of the form and a second portion at which said first reference pattern is presented, said first and second portions being separated by a line of perforations.

20. A computer according to claim 7 wherein said first reference pattern is detachably secured to said form by a non-aggressive adhesive.

* * * * *

UNITED STATES PATENT AND TRADEMARK OFFICE

CERTIFICATE OF CORRECTION

PATENT NO. : 5,187,774

DATED : February 16, 1993

INVENTOR(S) : Richard E. Ericson

It is certified that error appears in the above-indentified patent and that said Letters Patent is hereby corrected as shown below:

Col. 2, line 45, "form of holder" should be --form or holder--.

Col 3, line 13, "ba" should be --be--.

Col. 3, line 56, "ba" should be --be--.

Col. 4, line 38, "could" should be --would--.

Col. 5, line 3, "of the reference area" should be --on the reference area--.

Col. 6, line 3, "4" should be --44--.

Col. 6, line 5, "41" should be --44--.

Col. 6, line 40, "ba" should be --be--.

Col. 7, line 42, "o" should be --of--.

Col. 7, line 68, "for" should be --form--.

Col. 8, line 63, "firm" should be --form--.

Signed and Sealed this

Tenth Day of May, 1994

*Attest:*

BRUCE LEHMAN

*Attesting Officer* *Commissioner of Patents and Trademarks*